(12) United States Patent
Morrison et al.

(10) Patent No.: US 8,731,982 B2
(45) Date of Patent: May 20, 2014

(54) SYSTEM AND METHODOLOGY FOR SEQUENTIAL NAVIGATION AND MONITORING IN A BUSINESS PROCESS OR COMPLEX TASK

(75) Inventors: James Morrison, Landau (DE); Esther Blankenship, Mannheim (DE); Leif Jensen-Pistorius, Oestringen (DE); Peer Hilgers, St. Leon-Rot (DE)

(73) Assignee: SAP AG, Walldorf (DE)

( * ) Notice: Subject to any disclaimer, the term of this patent is extended or adjusted under 35 U.S.C. 154(b) by 1671 days.

(21) Appl. No.: 11/694,731

(22) Filed: Mar. 30, 2007

(65) Prior Publication Data

US 2008/0243567 A1 Oct. 2, 2008

(51) Int. Cl.
*G06Q 10/00* (2012.01)
(52) U.S. Cl.
USPC .......... 705/7; 705/26; 705/27; 705/39; 705/40
(58) Field of Classification Search
USPC ...................... 705/7, 26, 27, 39, 40
See application file for complete search history.

(56) References Cited

U.S. PATENT DOCUMENTS

| | | | | |
|---|---|---|---|---|
| 7,606,740 | B2 * | 10/2009 | Greaves et al. | 705/27 |
| 2002/0156695 | A1 * | 10/2002 | Edwards | 705/26 |
| 2002/0161668 | A1 * | 10/2002 | Lutz et al. | 705/26 |

\* cited by examiner

*Primary Examiner* — Nga B. Nguyen
(74) *Attorney, Agent, or Firm* — Schwegman, Lundberg & Woessner, P.A>

(57) ABSTRACT

A method and system to monitor steps in a business process or complex tasks are described. The method may include displaying a graphical step monitor in a graphical user interface of an application, using a plurality of graphical elements indicating statuses of a plurality of steps in a sequence of steps in a process. The method may include receiving update information related to one or more steps of the plurality of steps. The method may also include updating the statuses of the steps for which the update information was received and as indicated by the plurality of graphical elements. Furthermore, the method may include displaying a description region including a further plurality of graphical elements and texts, the texts describing the steps, the statuses of which are indicated by the graphical elements.

17 Claims, 12 Drawing Sheets

SYSTEM AND METHODOLOGY FOR SEQUENTIAL NAVIGATION AND MONITORING IN A BUSINESS PROCESS OR COMPLEX TASK

TECHNICAL FIELD

Embodiments relates generally to the field of computerized task management. In particular, embodiments relates to a method and system to monitor steps in a business process or complex task.

BACKGROUND

With technological advancements, software packages are playing a more important role in planning and managing complex tasks and business processes. Today, several packages are available on the market that may assist users in managing their projects. For example, MICROSOFT PROJECT (developed by Microsoft Corporation of Redmond, Wash.) may provide the tools necessary for managing a variety of projects. Systems such as MICROSOFT OUTLOOK (developed by Microsoft Corporation of Redmond, Wash.) are commonly used to create and manage tasks, email, contacts or the like.

In order to provide the end-user with a manageable amount of data, complex processes are decomposed into multiple easy-to-handle and understandable steps involving chunks of data. On the user interface of software applications, these information chunks may be combined in a defined sequence of screens which may lead the end-user through the complete process or task.

During the completion of any process or task, several pieces of meta-information, including the total number of steps needed to complete the process or task, the current step within the sequence of steps, and the completion statuses of individual steps, may be important for the end-user, in order to make informed decisions and manage the task in an efficient manner.

BRIEF DESCRIPTION OF THE DRAWINGS

Some embodiments are illustrated by way of example and not limitation in the figures of the accompanying drawings in which.

DETAILED DESCRIPTION

Example methods and systems to monitor steps in a business process or complex task using a user interface, including a graphical step monitor and a description region, are provided. A method may include displaying a graphical step monitor in a graphical user interface of an application, using multiple graphical elements to indicate statuses of multiple steps in a sequence of steps in a process; receiving update information related to one or more steps of the plurality of steps; and updating the statuses of the steps for which the update information was received and as indicated by the plurality of graphical elements.

In example embodiments, the process may be a business process or a complex task involving multiple steps. The statuses of the steps may include complete, current or future statuses. The completed status may indicate that all the assigned or defined sub-steps in that step are completed, however, the system may permit the user to step back and edit a completed step, if necessary. The current status may indicate that the step is active and the user may need to take action, allocating efforts and resources towards completion of that step. The future status may indicate that the step is to be completed further down the line and the user may need to make plans and prepare for taking action in completing the step in the future.

The method may also include providing an overflow indicator on the graphical step monitor, indicating that at least one further step is viewable upon extension. The method may further include displaying a description region including a further plurality of graphical elements and texts, the texts describing the steps, the statuses of which are indicated by the graphical elements. According to an example embodiment, the description region may show graphical elements similar to the one used in the graphical step monitor to indicate the status of various steps of the process. The text describing the step (e.g., "select item", or "enter shipping details") may appear in front of the graphical element, and the text may further include a step number representing the sequential position of the step within a sequence of steps associated with the process.

In example embodiments, a roll-over may simply be shown by arrow graphical buttons (overflow indicators) at the relevant ends of the graphical step monitor, indicating that navigation to the steps off the viewable screen may be possible on left or right. For example the overflow indicator on the right hand side of the graphical step monitor, may indicate that the user may navigate to see more future steps. Whereas the overflow indicator on the left side of the graphical step monitor may be an indication that more completed steps may be viewable on the left side by navigation.

The method may further include displaying at least one sub-step associated with a step of the plurality of steps. The method may use an alphanumeric character count to identify a sub-step. For example, step number 5 may include sub-steps 5.a, 5.b and 5.c, which may have respective descriptions in the description region.

In the following description, for purposes of explanation, numerous specific details are set forth in order to provide a thorough understanding of the present invention. However, it will be evident to a person of ordinary skill in art that the invention may be practiced without these specific details.

Figure 1:
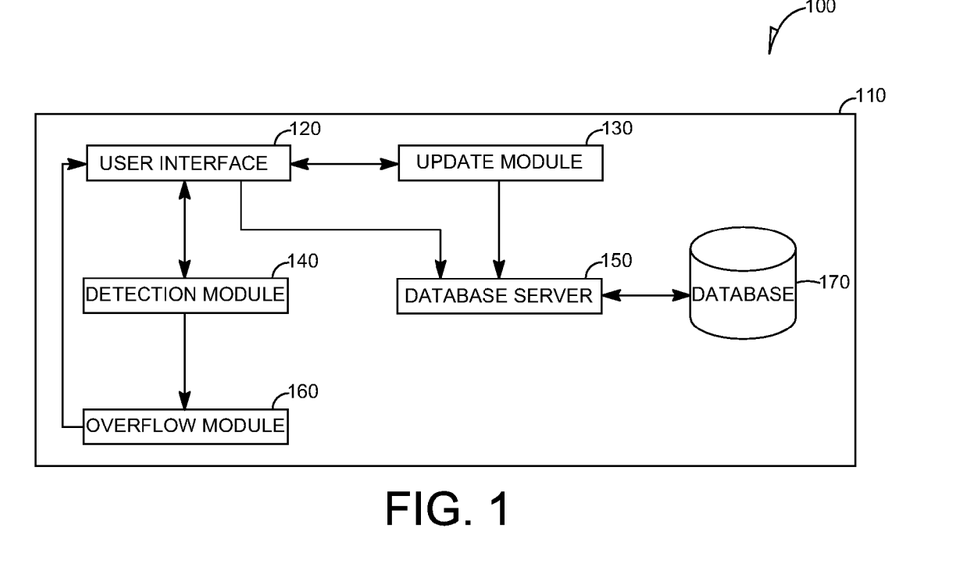
FIG. 1 is a high level block diagram illustrating an example system for displaying a graphical step monitor.

Referring to FIG. 1 of the drawings, reference 100 is a high level block diagram illustrating an example system for displaying a graphical step monitor. The example system 110 may display a graphical step monitor in a graphical user interface, using multiple graphical elements to indicate the status of each of multiple steps in a sequence of steps in a process. The system 110 may also receive update information related to the process. The example system 110 may include a user interface 120, a detection module 140, an update module 130, an overflow module 160, a database 170, and a database server 150.

Using the user interface 120, the example system 110 may display a graphical step monitor 620 (shown in FIG. 6) in a graphical user interface, using multiple graphical elements to indicate statuses of each of multiple steps in a sequence of steps in a process. The system 110 may also use the user interface module 120 to receive, from a user, update information related to one or more of the plurality of steps shown in the graphical step monitor 620.

The system 110 may use update module 130 to update the statuses of the one or more steps shown in the graphical step monitor 620. The updating of the one or more steps may be performed based on the update information received by the user interface module 120 from the user. In example embodiments, the update information may include, but is not limited to, any information pertaining to the process such as adding new steps, deleting or changing existing steps, adding, deleting or changing sub-steps, and adding, deleting or changing data, people or objects associated with the process or task.

Figure 9:
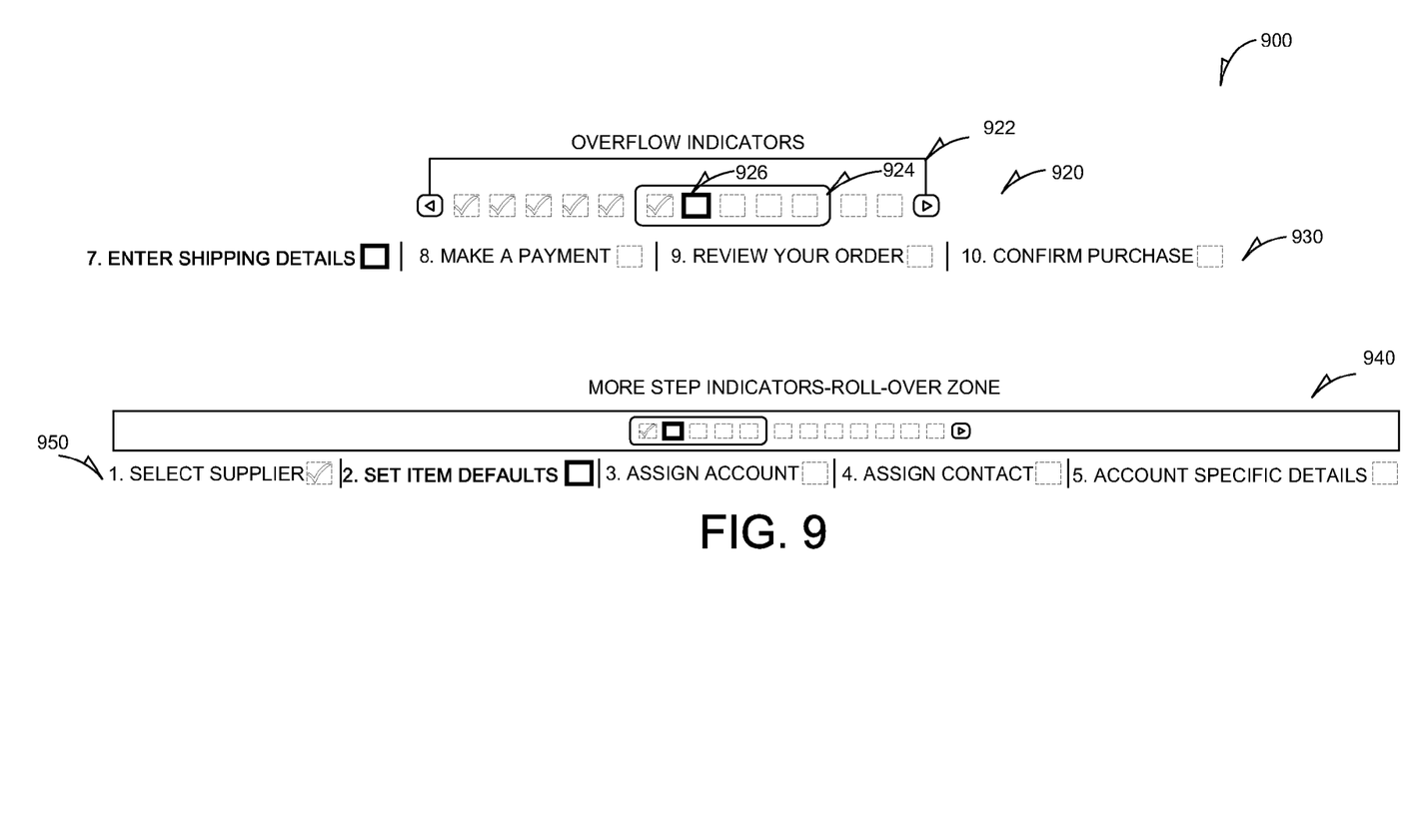
FIG. 9 shows a screen shot illustrating an example graphical user interface, including a graphical step monitor and a description region along with overflow indicators and extension steps.

The detection module 140 may detect the activation by the user of the overflow indicator(s) 922 (shown in FIG. 9). According to example embodiments, the activation by the user may include a mouseover or a mouse click on the overflow indicator(s) 922. In response to the detection, by the detection module 140, of the activation by the user of the overflow indicator(s) 922, the overflow module 160 may call on the user interface module 120 to display more steps on the respective side of the graphical step monitor 620. For example, the activation of overflow indicator 922 on the right hand side of the graphical step monitor 920 may cause display of additional future steps on the right hand side of the graphical step monitor 920. Likewise, activation of the overflow indicator 922 on the left hand side of the graphical step monitor 920 may cause display of additional completed steps on the left hand side of the graphical step monitor 920.

The system 110 may use the database 170 to store data tables related to various steps involved in a process, e.g., procedures, timelines, statuses, update resources, etc. The database server 150 may provide support services for accessing the database 170 including storing data in the database 170 and retrieving data from the database 170.

Figure 2:
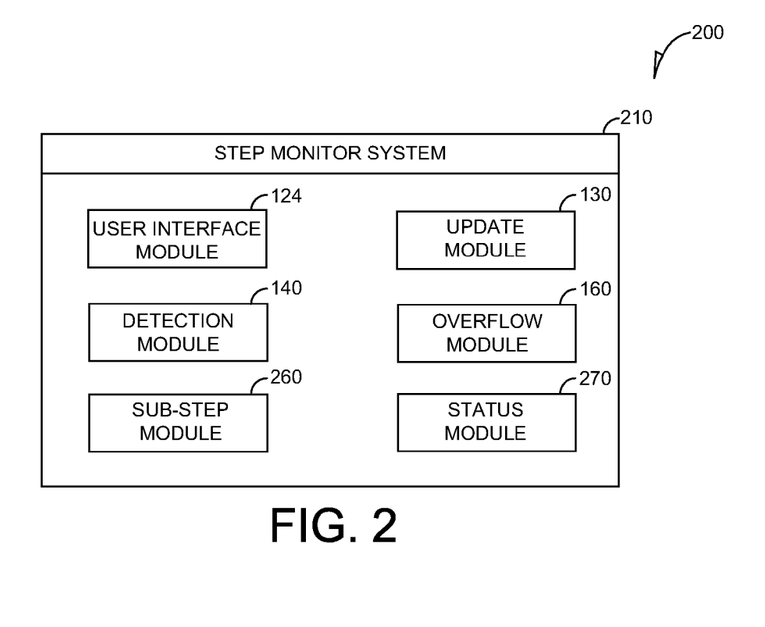
FIG. 2 is a high level block diagram illustrating example modules of a status monitor system.

Referring to FIG. 2, reference numeral 200 is a high level block diagram illustrating example modules of a step monitor system 210. The step monitor system 210 may include software modules, including user interface module 124, update module 130, detection module 140, overflow module 160, status module 270, and sub-step module 260.

The user interface module 124 may display a graphical step monitor 620 and a description region 630 (see FIG. 6) to the user of an application. The user interface module 120 may receive update information related to some steps of the graphical step monitor 620 from a user.

The update information received from the user by the user interface module 124 is utilized by the update module 130 to bring the data in the database 170 up to date. The update information, according to example embodiments, may include, but is not limited to, any information pertaining to the process, such as adding new steps, deleting or changing existing steps, adding, deleting or changing sub-steps, and adding, deleting or changing data, people or objects associated with the process or task.

The status module 270 may be responsible for monitoring any changes in the statuses of the steps in the process or the task, and reporting status changes to the user interface module 124, to be reflected in the graphical step monitor 620 and the description region 630. The statuses of the steps may include complete, current and future. According to example embodiments, the completed status may indicate that all the assigned or defined sub-steps in that step are complete and the user may not need to do anything with respect to that step, unless the task or process is redefined. The current status may indicate that the step is active, and the user may need to take some action and allocate efforts and resources towards completion of that step. The future status may indicate that the step is to be completed further down the line, and the user may need to make plans and prepare for taking action in completing the step in the future. In one example embodiment, complete, current and future statuses are displayed by different graphical signatures, such as a check mark enclosed in a broken-line square box for the completed status, a bolded empty square box for the current status, and a broken-line empty square box for the future status.

Whenever more completed steps or future steps exist than are viewable in the description region 630, overflow indicators (e.g., 922 in FIG. 9) are shown on the left or right hand side of the graphical step monitor 620, respectively. The overflow module 160 may control the display, by the user interface module 124, of overflow indicators 922 on the sides of the graphical step monitor. The overflow module 160 may also control the display, by the user interface module 124, of the descriptions and the statuses of the steps on the description region 630, in response to the detection by the detection module 140 of the activation, by the user, of the overflow indicators 922. The overflow steps (also referred to as "extension steps") may be displayed on the left or right hand side of the graphical step monitor 620, depending on the statuses of the steps. The future steps are displayed on the right hand side and the completed steps are displayed on the left hand side of the graphical step monitor 620. More specific details on the functionality of the overflow indicators 922 are described below.

Many complex tasks or business processes may involve steps that are convoluted and thus hard to follow without being broken into one or more sub-steps. In an example embodiment, the number or even the content of the sub-steps may not be know at the on-set of the process, or may be determined by the previous steps as they were completed (e.g., if country was selected as the United States of America (USA) in an earlier step, then a different amount of tax information sub-steps may be offered to the user). The step monitor system 210 may use the sub-step module 260 to manage the control of the sub-steps. The sub-step module 260 may call on the user interface module 124 to display an expanded view 1230 (see FIG. 12) of the graphical element representing the step 1120 which includes one or more sub-steps (also referred to as "round trip step"). The sub-step module 260 may also cause the user interface module 124 to display an alphanumeric character to identify each sub-step in the description region (see 1260 in FIG. 12).

Figure 3:
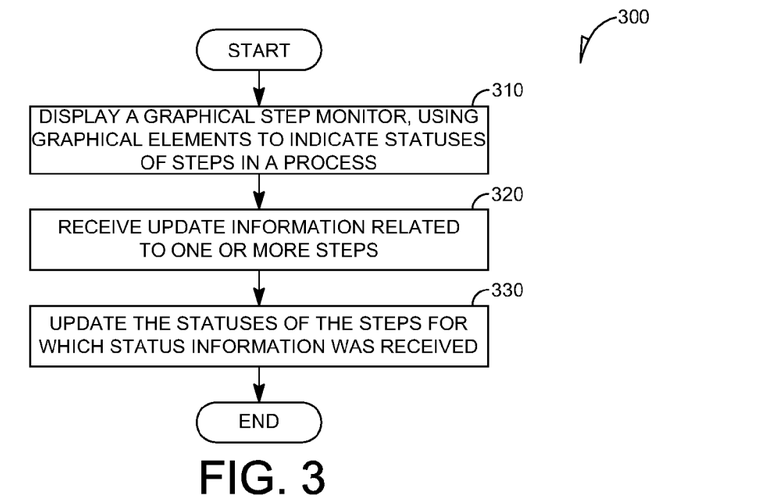
FIG. 3 is a high level flow diagram illustrating an example method for displaying a graphical step monitor and updating the statuses of the steps.
Figure 6:
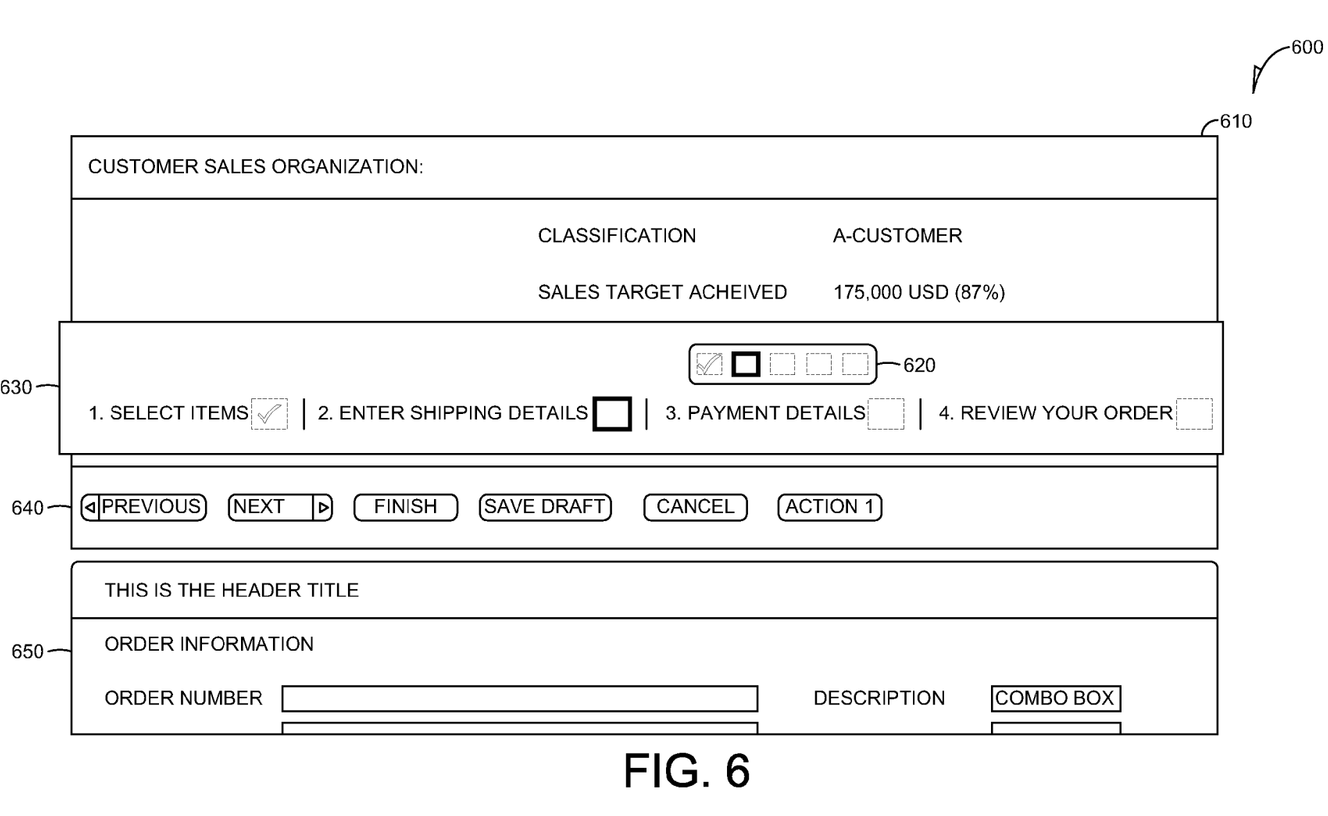
FIG. 6 shows a screen shot illustrating an example graphical user interface including a graphical step monitor and a description region.

FIG. 3 shows a high level flow diagram, illustrating an example method 300 for displaying a graphical step monitor and updating the statuses of the steps. The method starts at operation 310, where the user interface module 120 (FIGS. 1 and 2) may display a graphical step monitor 620 (FIG. 6). The graphical step monitor 620 may utilize different graphical elements to indicate the statuses of the steps in the process.

In an example embodiment, the statuses of the steps may include complete, current and future. According to an example embodiment the status module 270 may cause the user interface module 120 to display complete, current, and future statuses using different graphical signatures, such as a check mark enclosed in a broken-line square box for the completed status, a bolded empty square box for the current status, and a broken-line empty square box for the future status (see graphical elements 720, 730, and 740 in FIG. 7).

Returning to the method 300, at operation 320, the user interface module 124 (FIG. 2) receives update information related to one or more steps of the process from the user. The received update information is utilized by the update module 130 (FIGS. 1 and 2) to bring the data in the database 170 up to date. According to example embodiments, the update information may include, but is not limited to, any information pertaining to the process, such as adding new steps, deleting or changing existing steps, adding, deleting or changing sub-steps, and adding, deleting or changing data, people or objects associated with the process or task.

At operation 330, the update module 130 brings the data in the database 170 up to date. Then the status module 270 (FIG. 2) may report status changes to the user interface module 124 to be reflected in the graphical step monitor 620 and the description region 630 (FIG. 6). In one example embodiment, the statuses of the steps may include complete, current and future.

Figure 4:
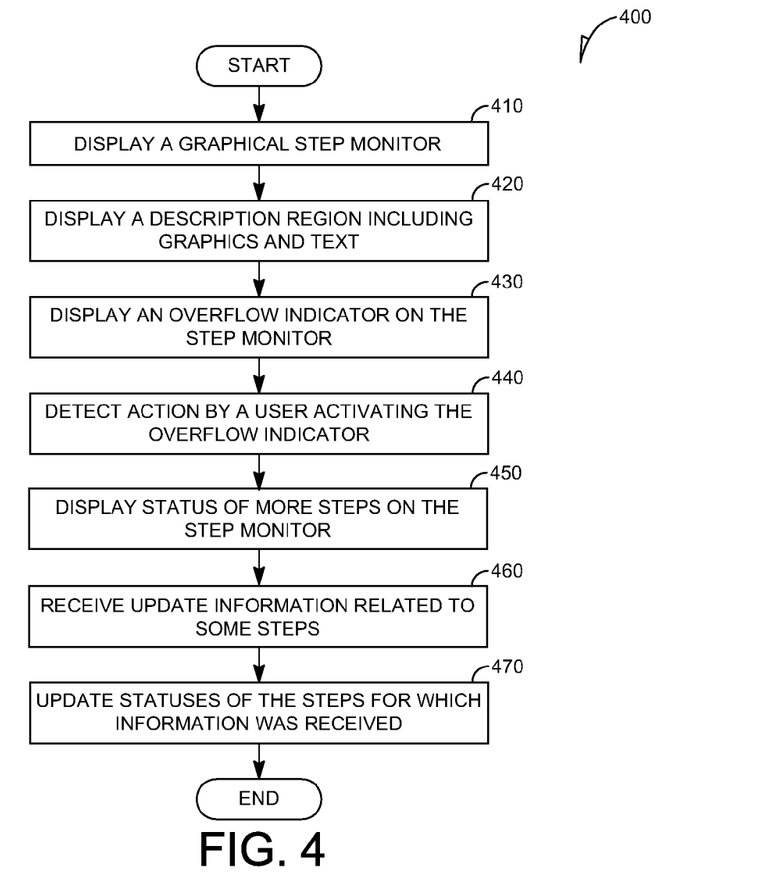
FIG. 4 is a flow diagram illustrating an example method for displaying a graphical step monitor including overflow indicators showing further steps.

Referring to FIG. 4 of the drawings, reference 400 is a flow diagram illustrating an example method for displaying a graphical step monitor including overflow indicators showing further steps. At operation 410, the user interface module 124 (FIG. 2) may display the graphical step monitor 620 (FIG. 6). At operation 420, the user interface module 120 (FIGS. 1 and 2) displays a description region 630 to further clarify each step graphically displayed in operation 410. In one example embodiment, the description region 630 (FIG. 6) may include graphical elements similar to those used in graphical step monitor 620, as well as additional texts numbered according to the position of the step within the sequence of steps of the process.

In example complex tasks or business processes, the larger number of steps involved may cause some of the steps to fall off the user screen. According to an example embodiment, at operation 430, the overflow module 160 (FIGS. 1 and 2) may instruct the user interface module 124 to display the overflow indicator 922 (FIG. 9) on the relevant sides of the graphical step monitor 620. The overflow indicators 922 may be activated by the user, utilizing activation methods including mouseover or mouse click on the overflow indicators 922 may indicate that navigation to steps off the viewable screen may be possible on left or right side of the graphical step monitor 620. For example the overflow indicator 922 on the right hand side of the graphical step monitor 620, may indicate that the user may navigate to see more future steps. Whereas the overflow indicator 922 on the left side of the graphical step monitor 620 may be an indication that more completed step may be viewable on the left side of the graphical step monitor 620, by navigation.

The navigation by the user of the proper buttons in the navigation region 640 (see FIG. 6) may be detected, at operation 440, by the detection module 140 (FIGS. 1 and 2). In response to the detection, at operation 450, the overflow module 160 may instruct the user interface module 120 to display more steps on the corresponding side of the graphical step monitor 620. For example the activation of the next step button on the navigation area 640 may roll over more future steps on the right hand side of the graphical step monitor 920. Whereas activation of previous step button on the navigation area 640 may result in rolling over of more completed steps on the left hand side of the graphical step monitor 620.

The description of operations 460 and 470 are the same as discussed above with regard to operations 320 and 330 of method 300, respectively.

Figure 5:
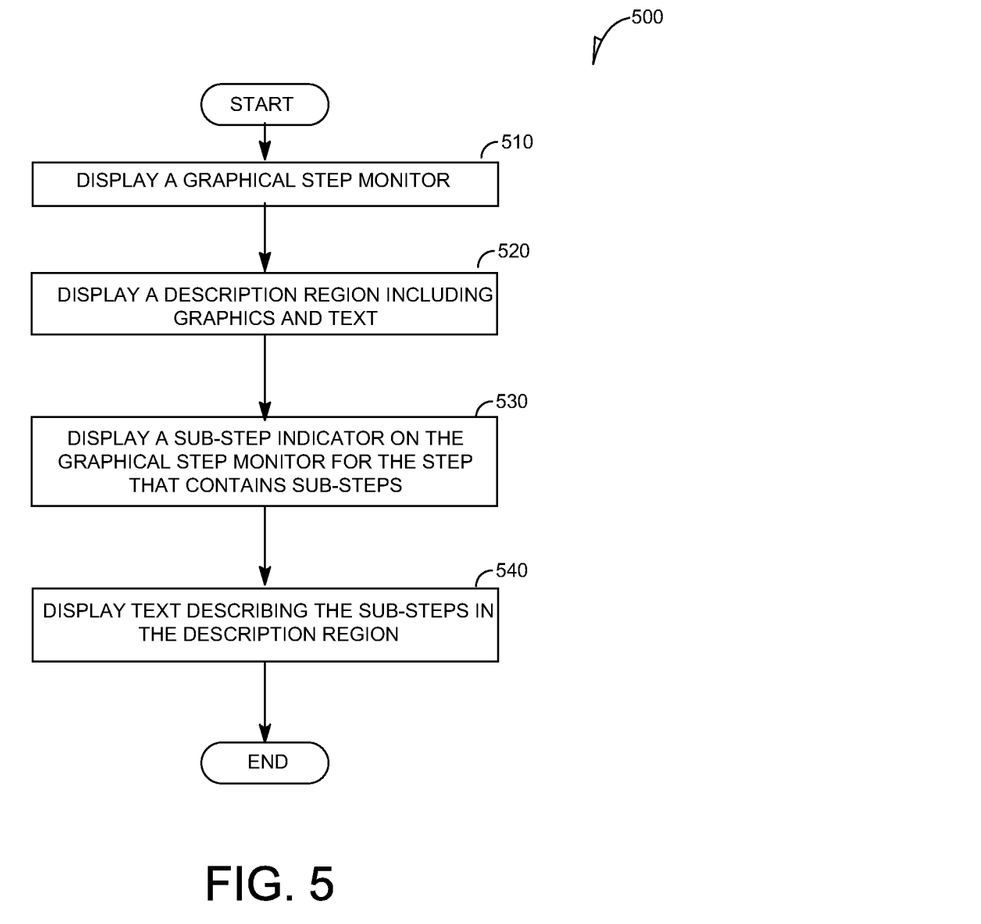
FIG. 5 is a flow diagram illustrating an example method for displaying a graphical step monitor including a sub-step indicator.
Figure 11:
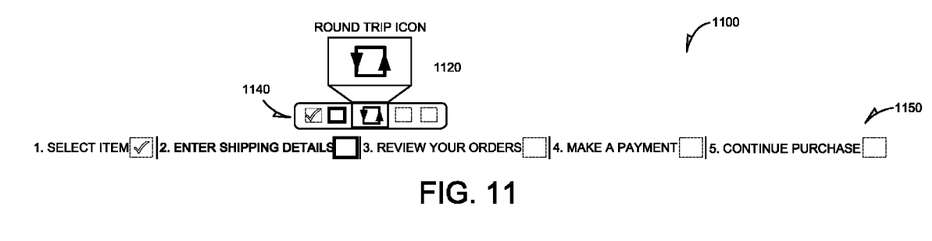
FIG. 11 shows a screen shot illustrating an example graphical user interface, including a round step graphical symbol indicating that a step in the graphical step monitor of FIG. 6 involves sub-steps.

Referring to FIG. 5 of the drawings, reference 500 designates a flow diagram illustrating an example method for displaying a graphical step monitor including a sub-step indicator. In this method 500, the description of operations 510 and 520 are the same as presented above with respect to operations 410 and 420 of FIG. 4. The following operations describe a situation where a particular step shown in the graphical step monitor 620 contains sub-steps. This step that contains sub-steps is referred to as a "round-trip step". At operation 530, the user interface module 120 (FIGS. 1 and 2) displays the sub-step indicator 1120 (FIG. 11). The screen shot in FIG. 11 shows a sub-step indicator 1120, which may make it possible to leave the context of a current application, go through sub-steps in a second context, and then return to the first context. The graphical representation of the sub-step indicator 1120 may appear only in the upper graphical step monitor area 1140 (FIG. 11). When the round-trip step becomes the current step of the process, then at operation 540, in response to a call from the sub-step module 260 (FIG. 2), the user interface module 120 may also display corresponding texts describing the sub-steps in the description region (see description region 1250 in FIG. 12).

Referring to FIG. 6 of the drawings, reference numeral 600 shows a screen shot illustrating an example graphical user interface including a graphical step monitor and a description region. The interface 610 includes the graphical step monitor 620, the description region 630, a navigation region 640 and a portion of a current step page 650.

As shown in the Figure, the graphical step monitor 620 includes different graphical elements for different statuses of the step. However, there is no text shown in the graphical step monitor 620. The text description of the steps are included in the description region 630, which also identifies each step with a numeric value indicating the position of the step in the sequence of steps of the process. The text and the graphical element associated with the current step are displayed in bold.

In the navigation region 640, necessary buttons for navigating through the steps of the process are provided. The screen shot also displays a portion of the page related to the current step, where the information pertinent to the step is displayed or received by the user interface module 120 (FIG. 1).

Figure 7:
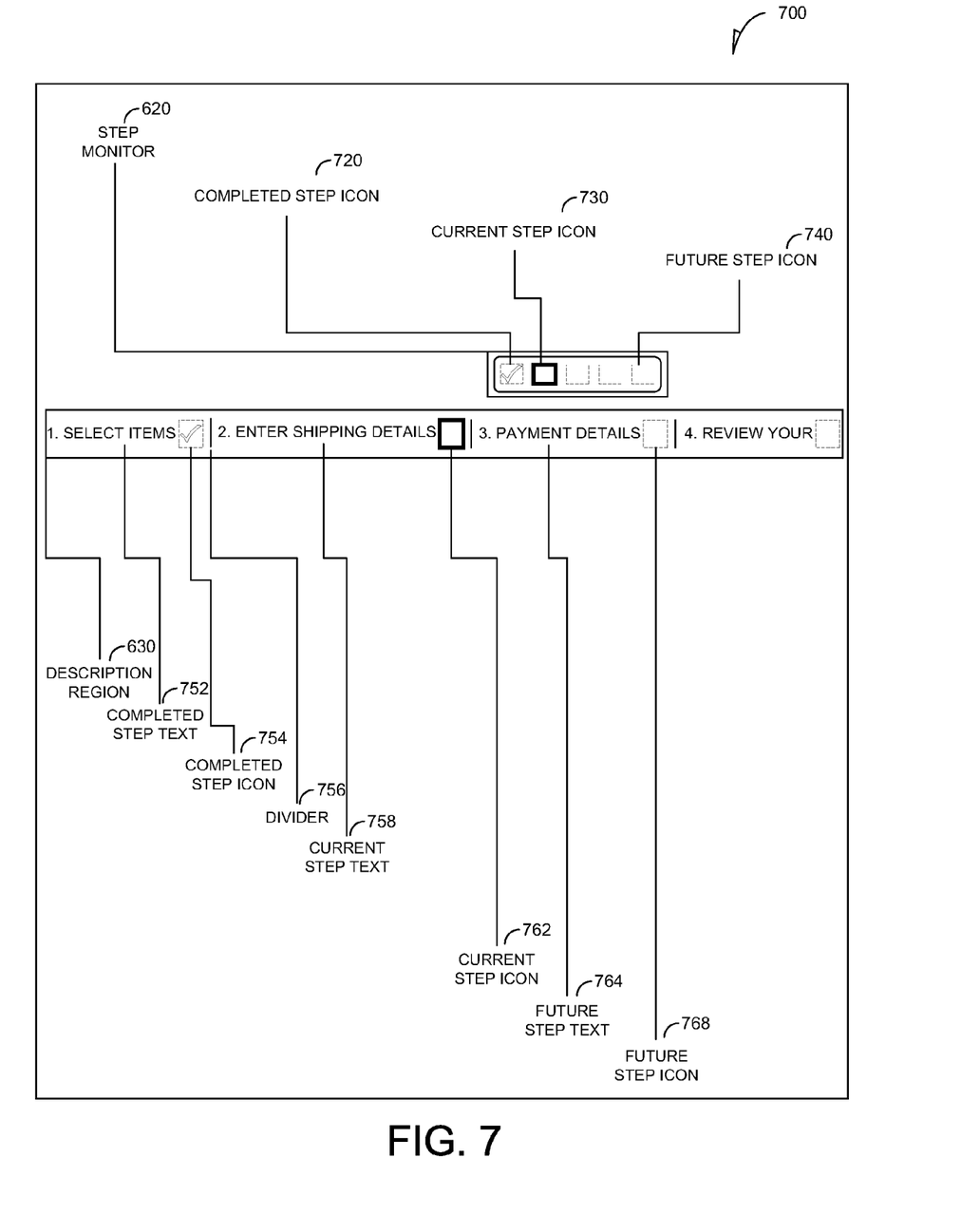
FIG. 7 shows a screen shot illustrating an example detailed description of the graphical and text elements of the example graphical user interface of FIG. 6.

Referring to FIG. 7 of the drawings, reference numeral 700 shows a screen shot illustrating an example detailed description of the graphical and text elements of the example graphical user interface of FIG. 6. The example graphical step monitor 620, as shown, may include three distinct graphical elements. The graphical element 720 shown as a check mark enclosed in a broken-line square box may represent a completed status. The graphical step monitor 620 may use the graphical element 730 consisting of a bolded solid-line square box to represent a current status of a step. The future steps 740 may be represented by empty broken-line square boxes.

In the description region 630, example graphical elements (also referred to as icons) 754, 762 and 768 may be, respectively, similar to the example graphical elements 720, 730 and 740 used in the graphical step monitor 620. The texts 752, 758, and 764, respectively, may describe the steps with the statuses of complete, current and future.

Figure 8:
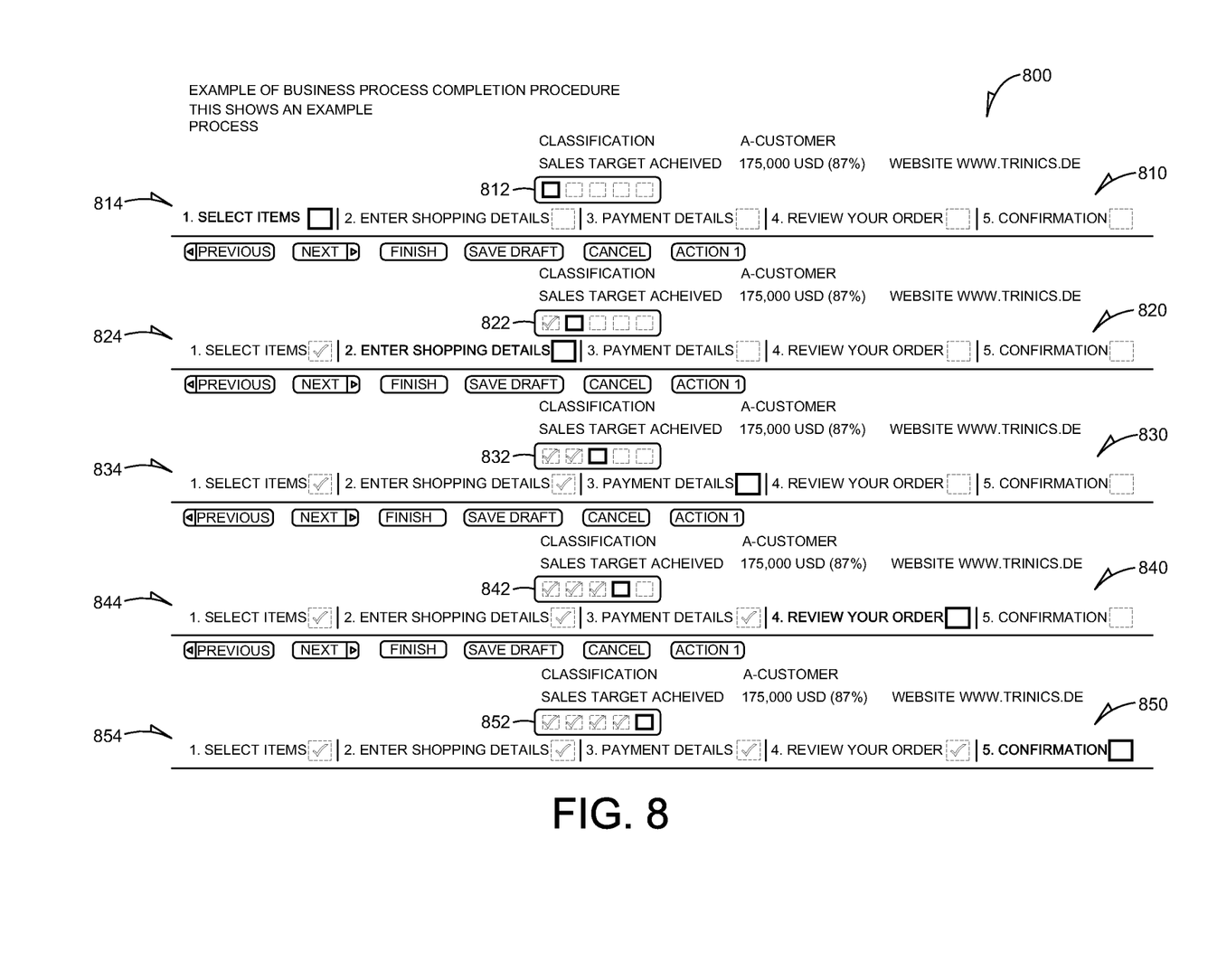
FIG. 8 shows a screen shot illustrating an example sequence of graphical user interfaces depicting an example business process completion.

Referring to FIG. 8 of the drawings, reference numeral 800 designates a series of screen shots illustrating an example sequence of graphical user interfaces illustrating an example business process completion procedure. The completion of steps progresses at example stages 810, 820, 830, 840 and 850. At stage 810, the example graphical step monitor 812 of this stage shows one current and four future steps. The example description region 814 for the stage 810 displays step number 1, namely the "select items" step as the current step. At stage 820, the example graphical step monitor 822 displays one completed step, one current step, and three future steps. The example description region 824 shows step number 1, entitled "select items", as completed and step number 2, namely, "enter shipping details" as current. At stage 830, two steps are completed graphical step monitor 832 shows that step number 3 is now the current step, and step 3 is displayed in bold in the description region 834. As the process progresses to stages 840 and 850, as shown in graphical step monitors 842 and 852, the previous current steps may convert to completed statuses; and according to the description regions 844 and 854, steps 4 and 5 become the respective current steps.

Referring to FIG. 9 of the drawings, reference 900 designates a screen shot illustrating an example graphical user interface including a graphical step monitor and a description region, along with overflow indicators and extension steps. The fact that overflow indicators 922 are displayed on both sides of the example graphical step monitor 920 indicates that there are both more completed and future steps which do not fit on the available screen in the description region 930, and that these steps are viewable upon extension, e.g. by clicking the overflow indicators 922. The steps described in the example description region 930 correspond to the collection of graphical elements enclosed in the example visible steps box 924.

The example description region 930 shows that step number 7, namely "enter shipping details" is the current activity. This step may correspond to the bold square box 926 inside the visible steps box 924. When the overflow indicators 922 are activated by the user, the visible steps box 924 containing the graphical elements corresponding to the steps described in the description region 930 moves accordingly. If the user activates the left hand side overflow indicator 922, the visible steps box 924 may move towards the left. In the example step monitor 940, only the first step is completed and the descriptions of the first five steps, shown in the visible step box 924, are presented in the description region 950. Thus, there is no overflow indicator on the left hand side of the step monitor 940. Simply because, there is no previous steps before the first step.

Figure 10:
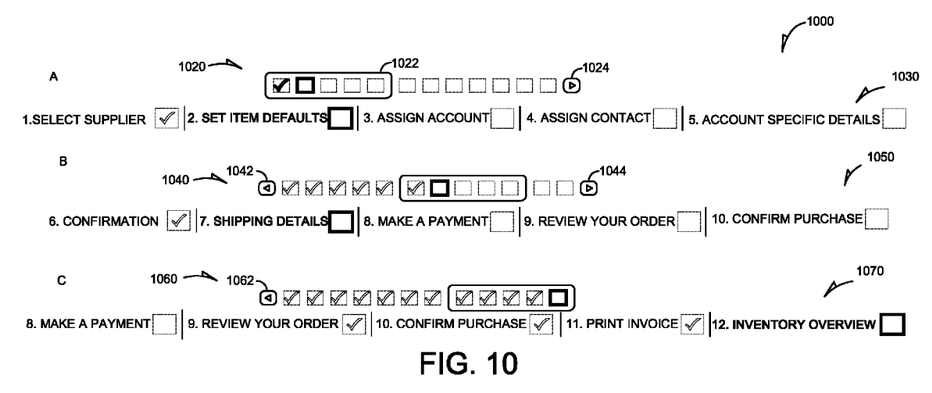
FIG. 10 shows a screen shot illustrating an example graphical user interface, including graphical step monitors and description regions along with extension steps and overflow indicators signaling that further steps are viewable upon extension.

Referring to FIG. 10 of the drawings, reference numeral 1000 shows a screen shot illustrating an example graphical user interface, including graphical step monitors and description regions along with extension steps and overflow indicators signaling that further steps are viewable upon extension. The screen shot 1000 shows how the overflow module 160 (FIG. 1) handles the overflow for a 12-step process, where the descriptions for all the steps available in the graphical step monitor do not fit in the description region.

The example description region 1030 displays the texts corresponding to the leading five steps of the example graphical step monitor 1020, namely the ones enclosed in box 1022. The displaying of the overflow indicator 1024 may indicate that there are more future steps that may be viewable in the description region 1030 by activation of the overflow indicator 1024.

The graphical step monitor 1040 illustrates another example, where the process has progressed and steps 1 through 6 are completed. The example description region 1050 shows the description of the subsequent five steps. The displaying of overflow indicators 1042 and 1044 may indicate that on both sides of the graphical step monitor 1040, there are more steps that cannot fit in the description region 1050.

Finally, in the last stage of the example process, graphical step monitor 1060 shows that all steps 1 through 11 are completed, and the 12$^{th}$ step is the current step. There are no more steps on the right hand side, and thus no overflow indicator is displayed on the right hand side of the example graphical step monitor 1060. In contrast, the example overflow indicator 1062 displayed on the left hand side indicates that there are additional steps on the left hand side that may be viewable in the example description region 1070 once the overflow indicator 1062 is activated.

In FIG. 11 of the drawings, reference 1100 shows a screen shot, illustrating an example graphical user interface including a round-trip step graphical symbol indicating that a step in the graphical step monitor 620 of FIG. 6 involves sub-steps. This screen shot shows an example sub-step indicator 1120, which may make it possible to leave the context of a current application, go through sub-steps in a second context, and then return to the first context. It is worth mentioning that the number of sub-steps in a given round-trip step may be dependent on information gathered in earlier steps of the process. Since a round-trip step containing sub-steps is at first recognized as a single step, it is given a graphical representation similar to those of other steps, but with circular arrows to indicate a cycle within the step.

The graphical visualization of the example round-trip step indicator 1120 may only occur in the upper graphical step monitor area 1140. In the example description area 1150, only the main steps are shown at this stage, because the process has not advanced to reach the round-trip step containing sub-steps.

Figure 12:
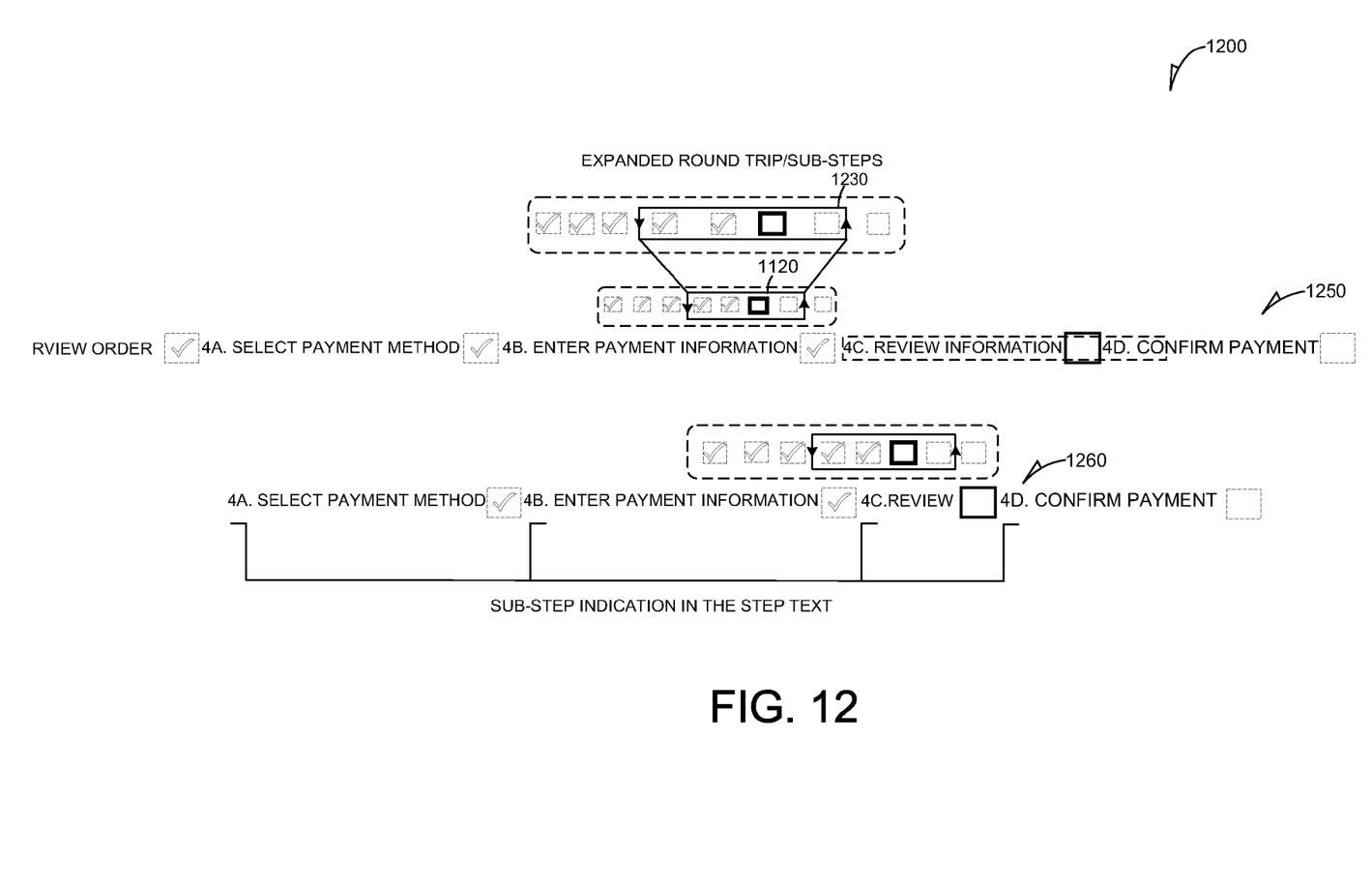
FIG. 12 shows a screen shot illustrating an example graphical user interface, including expanded sub-steps of a step in the graphical step monitor area of FIGS. 6 and 11.

Referring to FIG. 12 of the drawings, reference numeral 1200 designates a screen shot illustrating an example graphical user interface illustrating an expanded view of a round-trip step in the graphical step monitor area of FIGS. 6 and 11. This screen shot may represent a situation where the steps prior to a round-trip step have all been completed, and a round-trip step is now the current step.

Once reached in the progression of steps of the example process, the round-trip step 1120 displays the sub-steps inside the example round-trip step 1120. The sub-steps are also displayed in larger view 1230 above the icon. The example description region 1250 displays the descriptions of the sub-steps inside the round-trip step 1120. The portion 1260 displays an expanded view of the round-trip step 1120 and part of the description region 1250 showing only the description of sub-steps within the round-trip step 1120. Since the round-trip step 1120 was step number 4, the texts in the description region of the portion 1260 are numbered with 4 followed by extra alphabetical characters such as a, b, and c, to introduce them as sub-steps of step 4 in the sequence of steps of the process.

Figure 13:
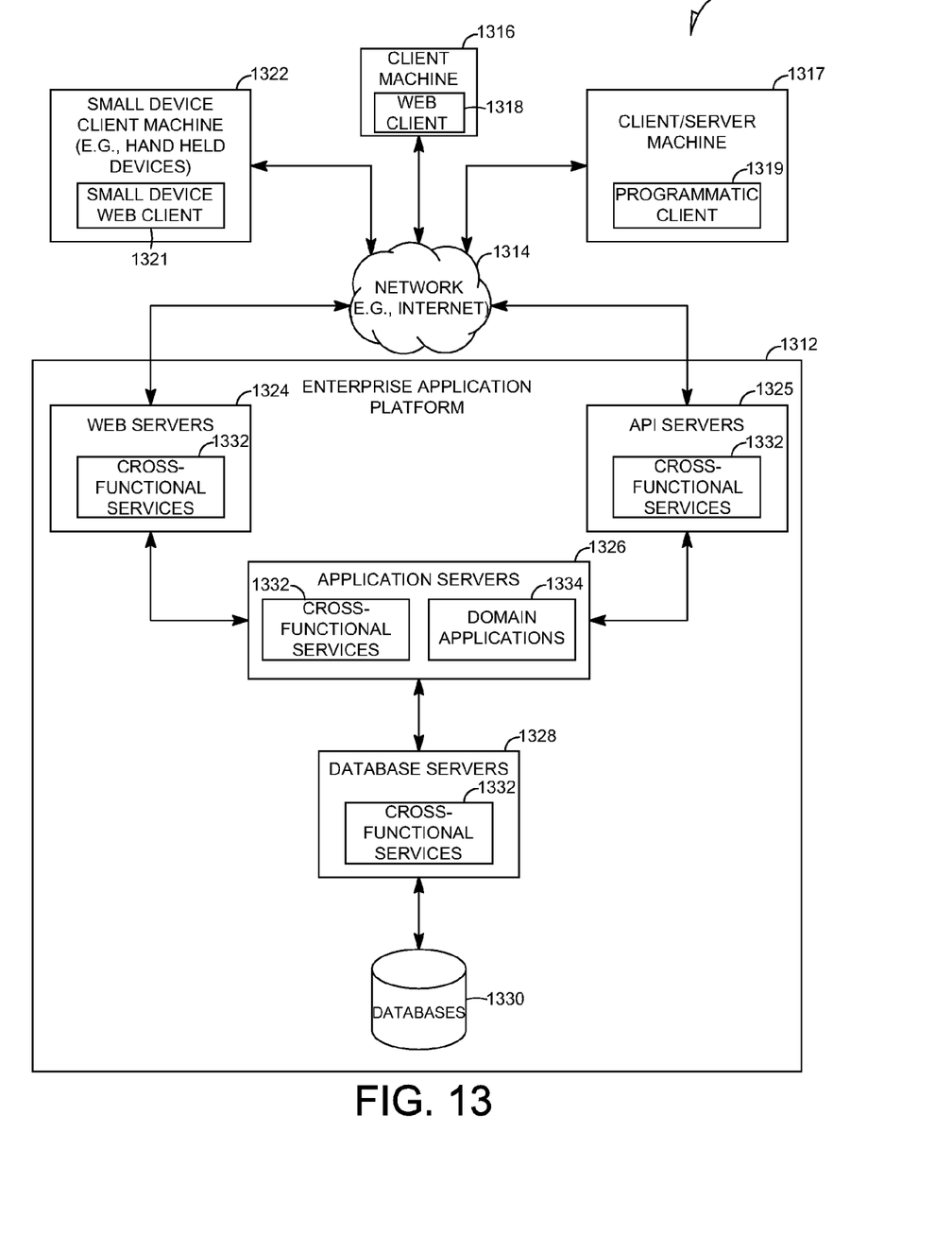
FIG. 13 is a network diagram depicting a system, according to one example embodiment, having a client-server architecture.

FIG. 13 is a network diagram depicting a system 1300 having a client-server architecture, according to one example embodiment. A platform (e.g., machines and software) in the example form of an enterprise application platform 1312 provides server-side functionality to one or more clients via a network 1314 (e.g., the Internet). FIG. 13 illustrates, for example, a client machine 1316 with web client 1318 (e.g., a browser, such as the INTERNET EXPLORER browser developed by Microsoft Corporation of Redmond, Wash.), a small device client machine 1322 with a small device web client 1321 (e.g., a browser without a script engine) and a client/server machine 1317 with a programmatic client 1319.

Turning specifically to the example enterprise application platform 1312, web servers 1324 and Application Program Interface (API) servers 1325 are coupled to, and provide web and programmatic interfaces to, application servers 1326. The application servers 1326 are, in turn, shown to be coupled to one or more database servers 1328 that facilitate access to one or more databases 1330. The web servers 1324, Application Program Interface (API) servers 1325, application servers 1326, and database servers 1328 host cross-functional services 1332. The application servers 1326 further host domain applications 1334.

The example cross-functional services 1332 provide services to users and processes that utilize the enterprise application platform 1312. For instance, the cross-functional services 1332 provide portal services (e.g., web services), database services and connectivity to the domain applications 1334 for users that operate the client machine 1316, the client/server machine 1317, and the small device client machine 1322. In addition, the cross-functional services 1332 provide an environment for delivering enhancements to existing applications and for integrating third party and legacy applications with existing cross-functional services 1332 and domain applications 1334. Further, while the system 1300 shown in FIG. 13 employs a client-server architecture, the present invention is of course not limited to such an architecture, and could equally well find application in a distributed, or peer-to-peer, architecture system.

Figure 14:
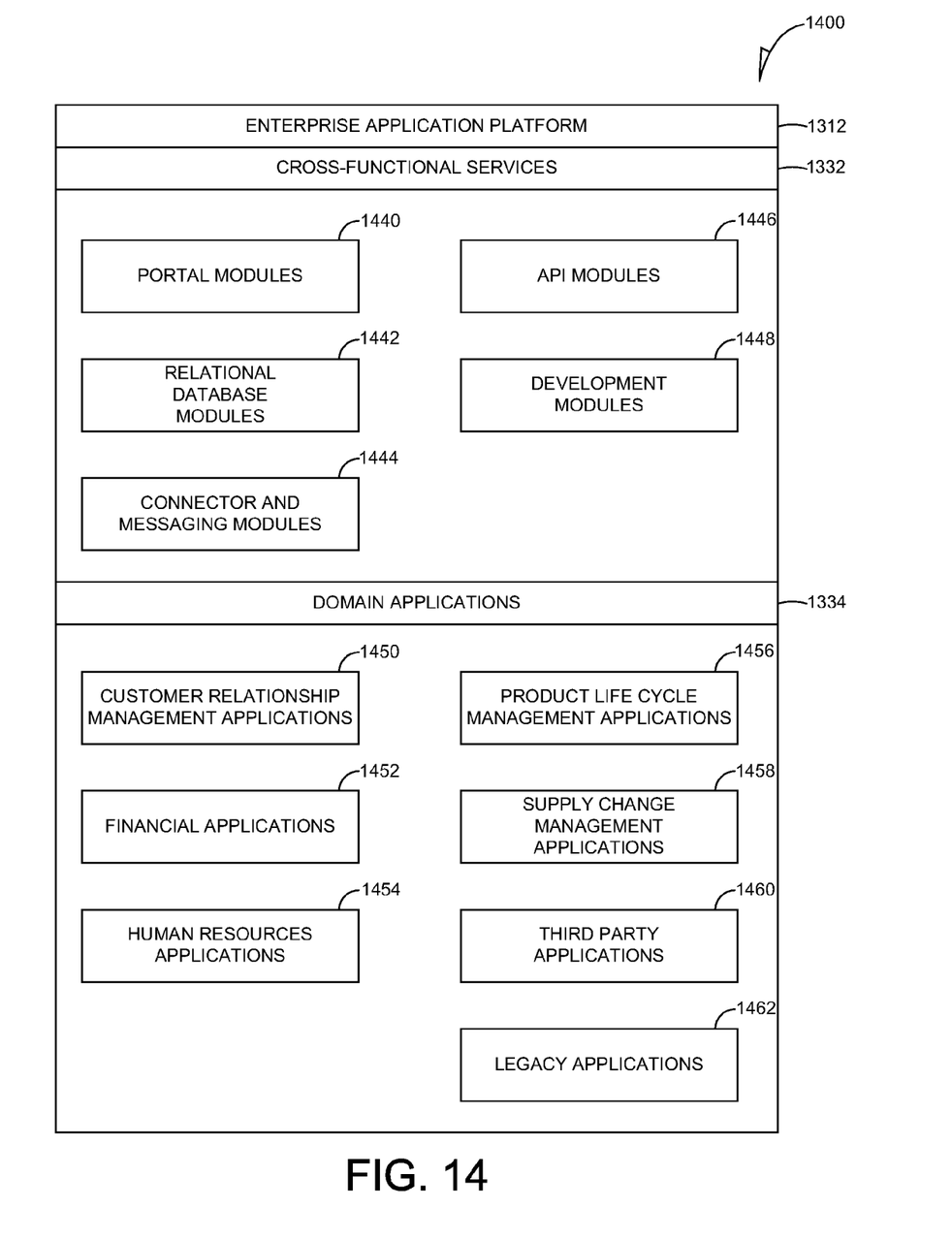
FIG. 14 is a block diagram illustrating enterprise applications and services as embodied in the enterprise application platform, according to an example embodiment.

FIG. 14 is a block diagram illustrating enterprise applications and services as embodied in the enterprise application platform 1312, according to an example embodiment. The enterprise application platform 1312 includes cross-functional services 1332 and domain applications 1334. The cross-functional services 1332 include portal modules 1440, relational database modules 1442, connector and messaging modules 1444, Application Program Interface (API) modules 1446, and development modules 1448.

The portal modules 1440 may enable a single point of access to other cross-functional services 1332 and domain applications 1334 for the client machine 1316, the small device client machine 1322 and the client/server machine 1317 (FIG. 13). The portal modules 1440 may be utilized to process, author, and maintain web pages that present content (e.g., user interface elements and navigational controls) to the user. In addition, the portal modules 1440 enable user roles, a construct that associates a role with a specialized environment that is utilized by a user to execute tasks, utilize services and exchange information with other users and within a defined scope. For example, the role determines the content that is available to the user and the activities that the user may perform. In addition, the portal modules 1440 comply with web services standards and/or utilize a variety of Internet technologies including JAVA, J2EE, Systems, Applications And Products in Data Processing's (SAP) Advanced Business Application Programming Language (ABAP) and WEB DYNPRO, XML, JCA, JAAS, X.509, LDAP, WSDL, WSRR, SOAP, UDDI and MICROSOFT.NET.

The relational database modules 1442 may provide support services for access to the database 1330 (FIG. 13) that includes a user interface library 1336. The relational database modules 1442 may provide support for object relational mapping, database independence, and distributed computing. The relational database modules 1442 may be utilized to add, delete, update and manage database elements. In addition the relational database modules 1442 may comply with database standards and/or utilize a variety of database technologies including SQL, SQLDBC, Oracle, MySQL, Unicode, and JDBC.

The connector and messaging modules 1444 may enable communication across different types of messaging systems that are utilized by the cross-functional services 1332 and the domain applications 1334, by providing a common messaging application processing interface. The connector and messaging modules 1444 may enable asynchronous communication on the enterprise application platform 1312.

The Application Program Interface (API) modules 1446 may enable the development of service-based applications by exposing an interface to existing and new applications as services. Repositories are included in the platform as a central place to find available services when building applications.

The development modules 1448 may provide a development environment for the addition, integration, updating and extension of software components on the enterprise application platform 1312 without impacting existing cross-functional services 1332 and domain applications 1334.

Turning to the domain applications 1334, the customer relationship management applications 1450 may enable access to and facilitate collecting and storing of relevant personalized information from multiple data sources and business processes. Enterprise personnel that are tasked with developing a buyer into a long-term customer may utilize the customer relationship management applications 1450 to provide assistance to the buyer throughout a customer engagement cycle.

Enterprise personnel may utilize the financial applications 1452 and business processes to track and control financial transactions within the enterprise application platform 1312. The financial applications 1452 facilitate the execution of operational, analytical, and collaborative tasks that are associated with financial management. Specifically, the financial applications 1452 enable the performance of tasks related to financial accountability, planning, forecasting, and managing the cost of finance.

The human resources applications 1454 may be utilized by enterprise personnel and business processes to manage, deploy, and track enterprise personnel. Specifically, the human resources applications 1454 enable the analysis of human resources issues and facilitate human resources decisions based on real time information.

The product life cycle management applications 1456 may enable the management of a product throughout the life cycle of the product. For example, the product life cycle management applications 1456 may enable collaborative engineering, custom product development, project management, asset management and quality management among business partners.

The supply chain management applications 1458 may enable monitoring of performance that is observed in supply chains. The supply chain management applications 1458 may facilitate adherence to production plans and on-time delivery of products and services.

The third party applications 1460, as well as legacy applications 1462, may be integrated with domain applications 1334 and utilize cross-functional services 1332 on the enterprise application platform 1312.

Figure 15:
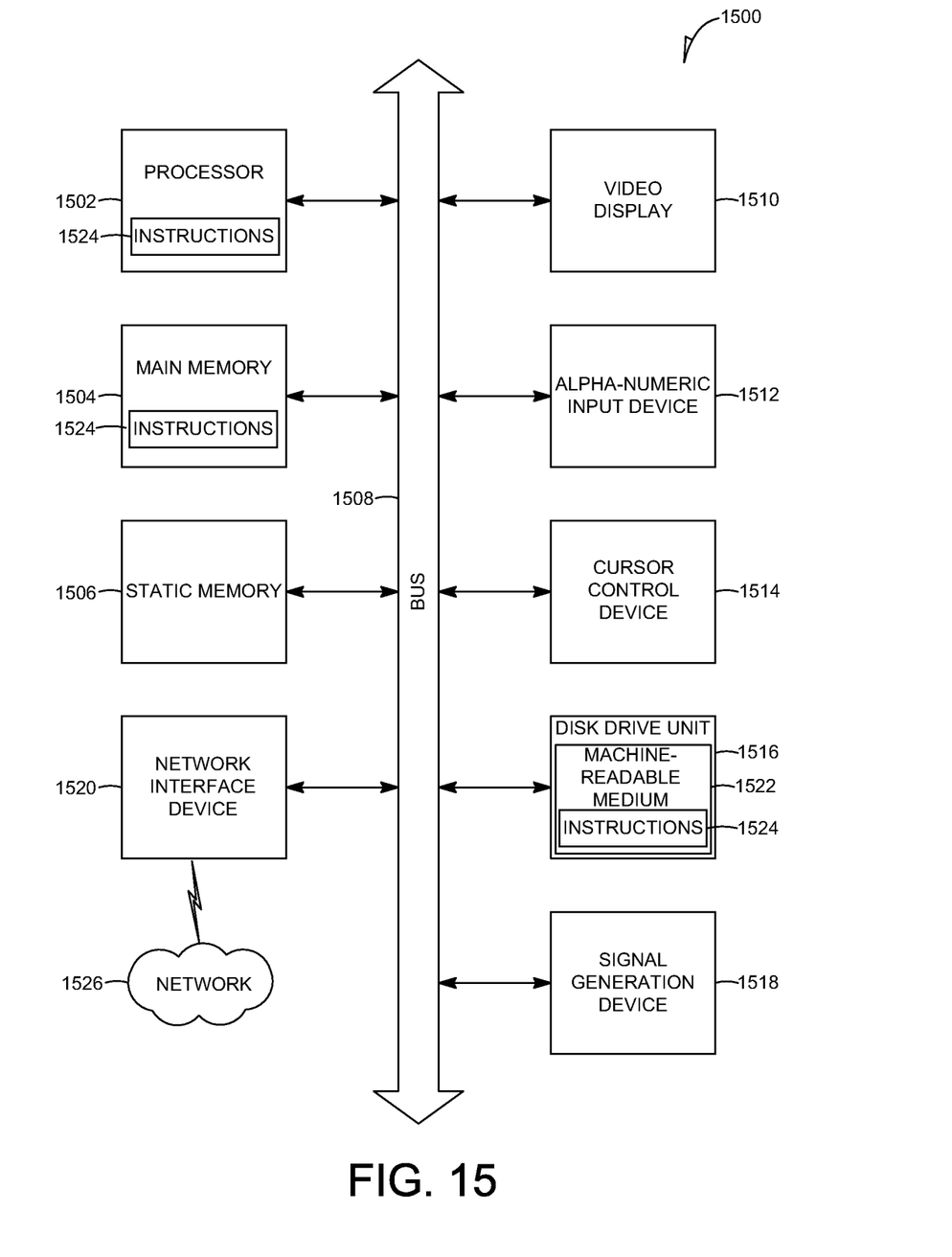
FIG. 15 shows an example machine in the form of a computer system to implement any one or more of the methods and/or systems described herein.

FIG. 15 shows a diagrammatic representation of a machine in the example form of a computer system 1500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a cursor control device 1514 (e.g., a mouse), a disk drive unit 1516, a signal generation device 1518 (e.g., a speaker) and a network interface device 1520.

The disk drive unit 1516 includes a machine-readable medium 1522 on which is stored one or more sets of instructions and data structures (e.g., software 1524) embodying or utilized by any one or more of the methodologies or functions described herein. The software 1524 may also reside, completely or at least partially, within the main memory 1504 and/or within the processor 1502 during execution thereof by the computer system 1500, the main memory 1504 and the processor 1502 also constituting machine-readable media.

The software 1524 may further be transmitted or received over a network 1526 via the network interface device 1520, utilizing any one of a number of well-known transfer protocols (e.g., HTTP).

While the machine-readable medium 1522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Thus, a method and system to monitor steps in a business process or complex task have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   displaying a graphical step monitor in a graphical user interface of an application, the graphical step monitor including a plurality of graphical elements, each of the plurality of graphical elements indicating a status of a respective step of a plurality of steps of a process, each of the plurality of graphical elements not including it textual description of the respective step, the displaying of the graphical step monitor in the graphical user interface of the application being performed by a processor;
   receiving update information related to one or more steps of the plurality of steps; and
   updating the plurality of graphical elements based on the receiving of the update information.

2. The method of claim 1, further comprising displaying an overflow indicator on the graphical step monitor, the overflow indicator indicating that an additional graphical element is viewable upon extension, the additional graphical element indicating a status of an extension step of the process, the additional graphical element being an icon.

3. The method of claim 1, further comprising displaying a description region including a further plurality of graphical elements and texts, the texts describing the steps, the statuses of which are indicated by the further plurality of graphical elements.

4. The method of claim 2, further comprising detecting an action by the user, the action being recognized as activating the overflow indicator to display the additional graphical element.

5. The method of claim 1, wherein each of the plurality of graphical elements indicates the status of the respective one of the plurality of stops as being one of a completed status, a current status, and a future status.

6. The method of claim 1, further comprising identifying he process as a business process.

7. A system comprising;
a processor;
a user interface module implemented by the processor and configured to:
  display a graphical step monitor, the graphical step monitor including a plurality of graphical elements, each of the plurality of graphical elements indicating a status of a respective step of a plurality of steps of a process, each of the plurality of graphical elements not including a textual description of the respective step; and
  receive update information related to one or more steps of the plurality of steps; and
an update module configured to update the plurality of graphical elements based on the receipt of the update information.

8. The system of claim 7, wherein the user interface is to further display a description region including a further plurality of graphical elements and texts, the texts describing the steps, the statuses of which are indicated by the further plurality of graphical elements.

9. The system of claim 7, further comprising a database to maintain information related to the process and a database serve to facilitate accessing the database.

10. The system of claim 7, wherein the user interface is to further provide an overflow indicator on the graphical step monitor, the overflow indicator indicates that an additional graphical element is viewable upon extension, the additional graphical element indicates a status of an extension step of the process, the additional graphical element being an icon.

11. The system of claim 10, further comprising a detection module, the detection module to detect an action by a user, the action being recognized as activating the overflow indicator to display the extension step.

12. The system of claim 7, wherein each of the plurality of graphical elements indicates the status of the respective one of the plurality of steps as being one of a completed status, a current status, and a future status.

13. The system of claim 7, wherein the user interface is to display at least one sub-stems associated with a step of the plurality of steps.

14. A non-transitory machine-readable medium embodying instructions, which when executed by a machine, cause the machine to
  display a graphical step monitor in a graphical user interface of an application, the graphical step monitor including a plurality of graphical elements, each of the plurality of graphical elements indicating a status of a respective step of a plurality of steps of a process, each of the plurality of graphical elements not including a textual description of the respective step;
  receive update information related to one or more steps of the plurality of steps; and update the plurality of graphical elements and the further plurality of graphical elements.

15. The non transitory machine-readable medium of claim 14, wherein the instructions are to further cause the machine to provide an overflow indicator on the graphical step monitor, the overflow indicator indicating that an additional graphical element is viewable upon extension, the additional graphical element indicating a status of an extension step of the process, the additional graphical element being an icon.

16. The non-transitory machine-readable medium of claim 15, wherein the instructions are to further cause the machine to detect an action by a user, the action being recognized as activating the overflow indicator to display the extension step.

17. The method of claim 1, the status of the respective step pertaining to a completion of the respective step.

\* \* \* \* \*